United States Patent
Mukherji et al.

(10) Patent No.: US 10,721,708 B1
(45) Date of Patent: Jul. 21, 2020

(54) DEVICE LOCATION CLASSIFICATION USING DATA COLLECTED BY WIRELESS ACCESS POINTS

(71) Applicant: Cisco Technology, Inc., San Jose, CA (US)

(72) Inventors: Abhishek Mukherji, Fremont, CA (US); Santosh G. Pandey, Fremont, CA (US); Rong Peng, Los Altos, CA (US); Vinay Raghuram, Cupertino, CA (US); Liu Huang, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/196,701

(22) Filed: Nov. 20, 2018

(51) Int. Cl.
| | |
|---|---|
| *H04W 64/00* | (2009.01) |
| *H04W 4/021* | (2018.01) |
| *G01S 11/06* | (2006.01) |
| *G01S 11/04* | (2006.01) |
| *G01S 5/14* | (2006.01) |
| *G06N 20/00* | (2019.01) |

(52) U.S. Cl.
CPC ............ *H04W 64/003* (2013.01); *G01S 5/14* (2013.01); *G01S 11/04* (2013.01); *G01S 11/06* (2013.01); *G06N 20/00* (2019.01); *H04W 4/021* (2013.01)

(58) Field of Classification Search
CPC .... H04W 64/003; H04W 4/021; G06N 20/00; G01S 11/04; G01S 11/06; G01S 5/14
USPC .............................................. 455/456.1–457
See application file for complete search history.

(56) References Cited

U.S. PATENT DOCUMENTS

| | | | |
|---|---|---|---|
| 6,754,504 B1 * | 6/2004 | Reed ....................... | G06Q 50/00 455/414.1 |
| 9,247,381 B2 * | 1/2016 | Venkatraman ........ | H04W 24/08 |
| 2011/0136463 A1 * | 6/2011 | Ebdon .................... | G01C 21/20 455/404.1 |
| 2015/0296389 A1 * | 10/2015 | Wirola .................. | H04W 64/00 455/500 |
| 2015/0351071 A1 * | 12/2015 | Pandey ............... | H04W 64/003 455/456.1 |

(Continued)

OTHER PUBLICATIONS

Andy Liaw et al., "Classification and Regression by randomForest", vol. 2/3, ISSN 1609-3631, Dec. 2002, 4 pages.

(Continued)

*Primary Examiner* — Marisol Figueroa
(74) *Attorney, Agent, or Firm* — Edell, Shapiro & Finnan, LLC

(57) ABSTRACT

Techniques for generating a prediction for a location of a mobile device includes a network controller obtaining signal strength information and angle-of-arrival information for mobile devices from a plurality of access points disposed at a location that includes two or more zones. The network controller extracts features from the obtained information. The features indicate whether the mobile devices are more likely in a first zone than in one or more of second zones of the two or more zones. The network controller generates a software model for classifying a mobile device into one of the two or more zones by applying a computer learning process to the extracted features. The network controller uses the software model to generate a prediction indicating that a first mobile device is in one of the two or more zones, and performs an action at the location based on the prediction.

20 Claims, 10 Drawing Sheets

(56) References Cited

U.S. PATENT DOCUMENTS

| | | | | |
|---|---|---|---|---|
| 2016/0157201 | A1* | 6/2016 | Silverman | H04W 64/00 |
| | | | | 455/456.1 |
| 2016/0174033 | A1* | 6/2016 | Barrand | H04W 4/02 |
| | | | | 455/456.3 |
| 2017/0201865 | A1* | 7/2017 | Cho | H04W 4/026 |
| 2017/0280281 | A1* | 9/2017 | Pandey | H04W 4/02 |
| 2018/0109399 | A1* | 4/2018 | Cardoso de Moura | |
| | | | | H04L 12/4633 |

OTHER PUBLICATIONS

J.R. Quinlan, "Induction of Decision Trees", Machine Learning 1: 81-106, 1986, 26 pages.

Corinna Cortes et al., "Support-Vector Networks", Machine Learning, 20, 273-297, 1995, 25 pages.

Ying-Huey Fua et al., "Hierarchical Parallel Coordinates for Exploration of Large Datasets", VIS '99 Proceedings of the Conference on Visualization, 1999, 8 pages.

Sasank Reddy et al., "Using Mobile Phones to Determine Transportation Modes", ACM Transactions on Sensor Networks, vol. 6, No. 2, Article 13, Publication date: Feb. 2010, 27 pages.

Zhenyu Chen et al., "Online Sequential ELM based Transfer Learning for Transportation Mode Recognition", 2013 IEEE Conference on Cybernetics and Intelligent Systems (CIS), Nov. 12-15, 2013, 6 pages.

Leon Stenneth et al., "Transportation Mode Detection using Mobile Phones and GIS Information", Proceedings of the 19th ACM SIGSPATIAL International Conference on Advances in Geographic Information Systems, Nov. 1, 2011, 10 pages.

Min Y. Mun et al., "Parsimonious Mobility Classification using GSM and WiFi Traces", Proceedings of the Fifth Workshop on Embedded Networked Sensors, Jun. 2-3, 2008, 5 pages.

Meng-Chieh Yu et al., "Big Data Small Footprint: The Design of A Low-Power Classifier for Detecting Transportation Modes", Proceedings of the VLDB Endowment, 7(13):1429-1440, Sep. 1-5, 2014, 12 pages.

Theresa Nick et al., "Classifying Means of Transportation Using Mobile Sensor Data", The 2010 International Joint Conference on Neural Networks (IJCNN), Jul. 18-23, 2010, 6 pages.

Samuli Hemminki et al., "Accelerometer-Based Transportation Mode Detection on Smartphones", Proceedings of the 11th ACM Conference on Embedded Networked Sensor Systems, Nov. 11-15, 2013, 14 pages.

Today Online, "Free Wi-Fi at all MRT, LRT stations by 2020", www.gov.sg/news/content/today-online-free-wifi-at-all-mrt-lrt-stations-by-2020, Oct. 13, 2015, 5 pages.

Lei Kang et al., "A Wireless-Based Approach for Transit Analytics", Proceedings of the 17th International Workshop on Mobile Computing Systems and Applications, ACM HotMobile, Feb. 26-27, 2016, 6 pages.

Ruckus Wireless, Inc., "Ruckus SPot™", Best Practice Guide v2, https://supportalcadis.nl/Support_files/Ruckus/SPoT//Best%20Practice%20Guide/SPoT%20Best%20Practice%20Guide%20v2.0.pdf, 2016, 17 pages.

Ruckus Networks, "Ruckus SPoT™ Wi-Fi Location Engine and Analytics", Datasheet, downloaded Mar. 4, 2020, 3 pages.

Extreme Networks, Inc., "ExtremeLocation™ for Retail", Solution Brief, www.extremenetworks.com, downloaded Mar. 4, 2020, 4 pages.

Aruba, "Mobile Engagement", Solution Overview, www.arubanetworks.com, May 18, 2018, 4 pages.

Hewlett Packard Enterprise Development LP, "Accurate indoor positioning with HPE Location Analytics", Business white paper, Rev. 1, 4AA5-6244ENW, Jan. 2016, 12 pages.

Cooney, Michael, "Juniper's Mist adds WiFi 6, AI-based cloud services to enterprise edge", Network World, https://www.networkworld.com/article/3405123/juniper-s-mist-adds-wifi-6-ai-based-cloud-services-to-enterprise-edge.html, Jun. 26, 2019, 4 pages.

Juniper Networks, Inc., "Mist Platform", https://www.juniper.net/us/en/products-services/wireless/mist/, downloaded Mar. 4, 2020, 12 pages.

Huawei Technologies Co., Ltd., "Business Wi-Fi", https://e.huawei.com/in/related-page/solutions/business-needs/enterprise-network/campus-network/partners/business-wi-fi downloaded Mar. 4, 2020, 7 pages.

Huawei Technologies Co., Ltd., "WLAN Positioning Technology", White Paper, Issue 01, May 10, 2013, 17 pages.

\* cited by examiner

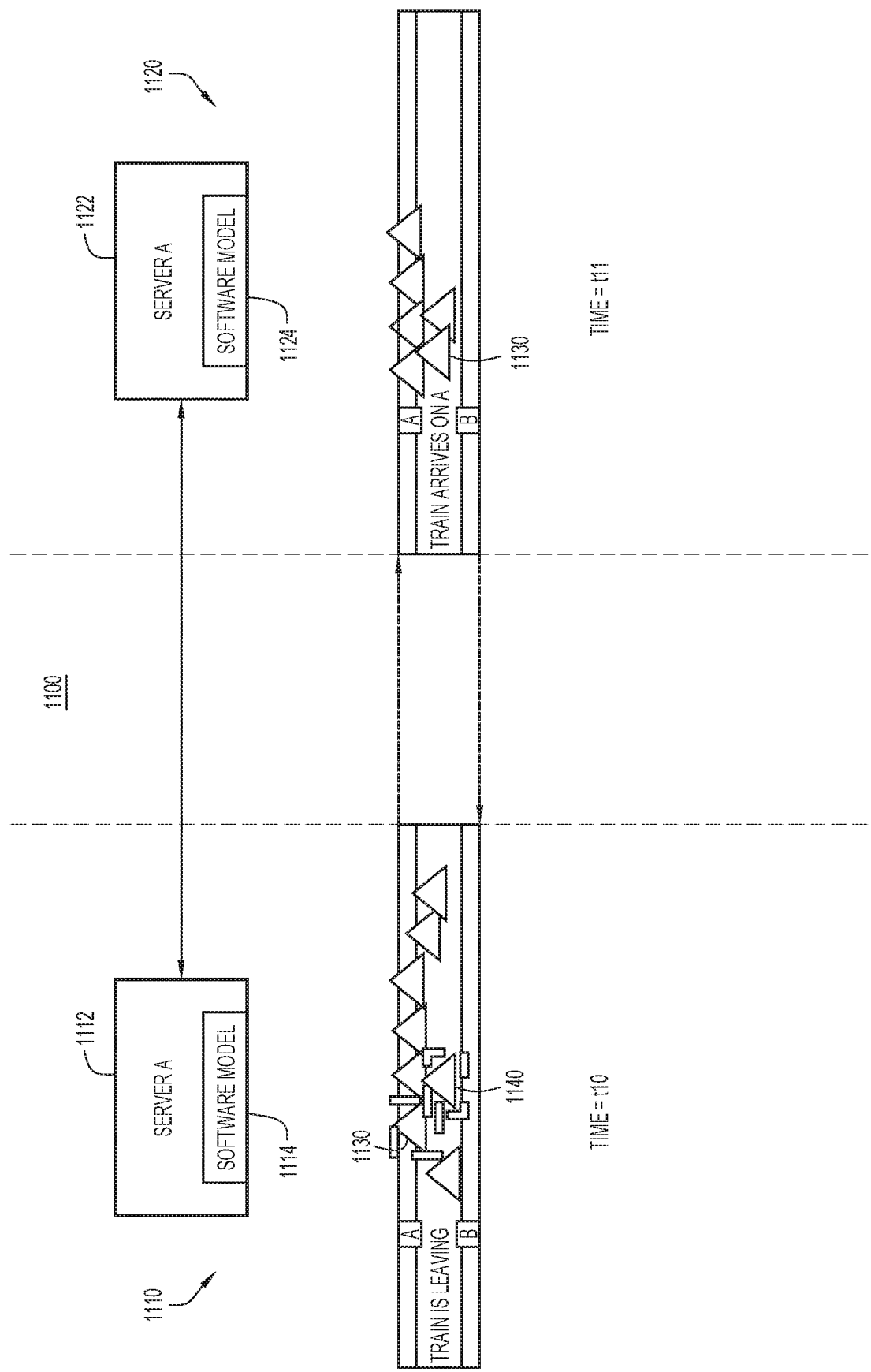

DEVICE LOCATION CLASSIFICATION USING DATA COLLECTED BY WIRELESS ACCESS POINTS

TECHNICAL FIELD

The present disclosure relates to techniques for determining device locations using data collected by wireless access points.

BACKGROUND

Mobile devices are ubiquitous at every corner of the urban life. People carry their mobile phones or fitness tracking devices everywhere they go. Many services have been developed based on where a user is located. For example, an advertisement service may provide advertisements to a mobile device based on whether a user is located close to a particular merchant. In some use cases, when a location includes multiple zones (e.g., a store or a walkway in a shopping mall), it may be desirable to know in which zone a user's mobile device is located.

BRIEF DESCRIPTION OF THE DRAWINGS

FIG. 11 is a schematic diagram showing a system for refining software models for location predictions for mobile devices, according to an example embodiment.

DESCRIPTION OF EXAMPLE EMBODIMENTS

Overview

Techniques are provided herein for taking an action based on a prediction of a physical location of a wireless mobile device. A network controller obtains signal strength information and angle-of-arrival information from a plurality of access points disposed at a location that includes two or more zones. The signal strength information and angle-of-arrival information are collected by the plurality of access points communicating with mobile devices at the location. Features are extracted from the signal strength information and angle-of-arrival information. The features indicate whether the mobile devices are more likely in a first zone than in one or more of second zones of the two or more zones. A software model is generated for classifying a mobile device into one of the two or more zones by applying a computer learning process to the extracted features. First signal strength information and first angle-of-arrival information are obtained from the plurality of access points communicating with a first mobile device different from the mobile devices. First features are extracted from the first signal strength information and the first angle-of-arrival information associated with the first mobile device. The first features are supplied to the software model to generate a prediction indicating that the first mobile device is in one of the two or more zones. An action is performed at the location based on the location prediction.

DETAILED DESCRIPTION

Mobile devices such as wireless mobile phones provide many useful benefits from location-based services, including instant entertainment and communications to users. As a result, users tend to carry their mobile device at all times. There are various technologies used to track mobile wireless users. For example, video monitoring systems may employ image recognition techniques to provide an accurate head count of users at a location. However, privacy issues may concern entities from using those video monitoring technologies.

Techniques are provided to estimate head count of users at a particular location. Particularly, when the location includes two or more zones in which it is desirable to know how many, whether or when mobile devices are located, the techniques disclosed herein may provide an improved estimate/prediction as to in which of the zones a mobile device or devices are located. Based on the estimated/predicted location, an action may be taken. For example, when it is estimated that mobile devices/users move from a first zone to a second zone, a "smart" air conditioning may be controlled to reduce the air condition at the first zone and increase air condition at the second zone. Throughout this disclosure, the terms "estimate", "detection", "prediction" and "classification" are used interchangeably.

Figure 1:
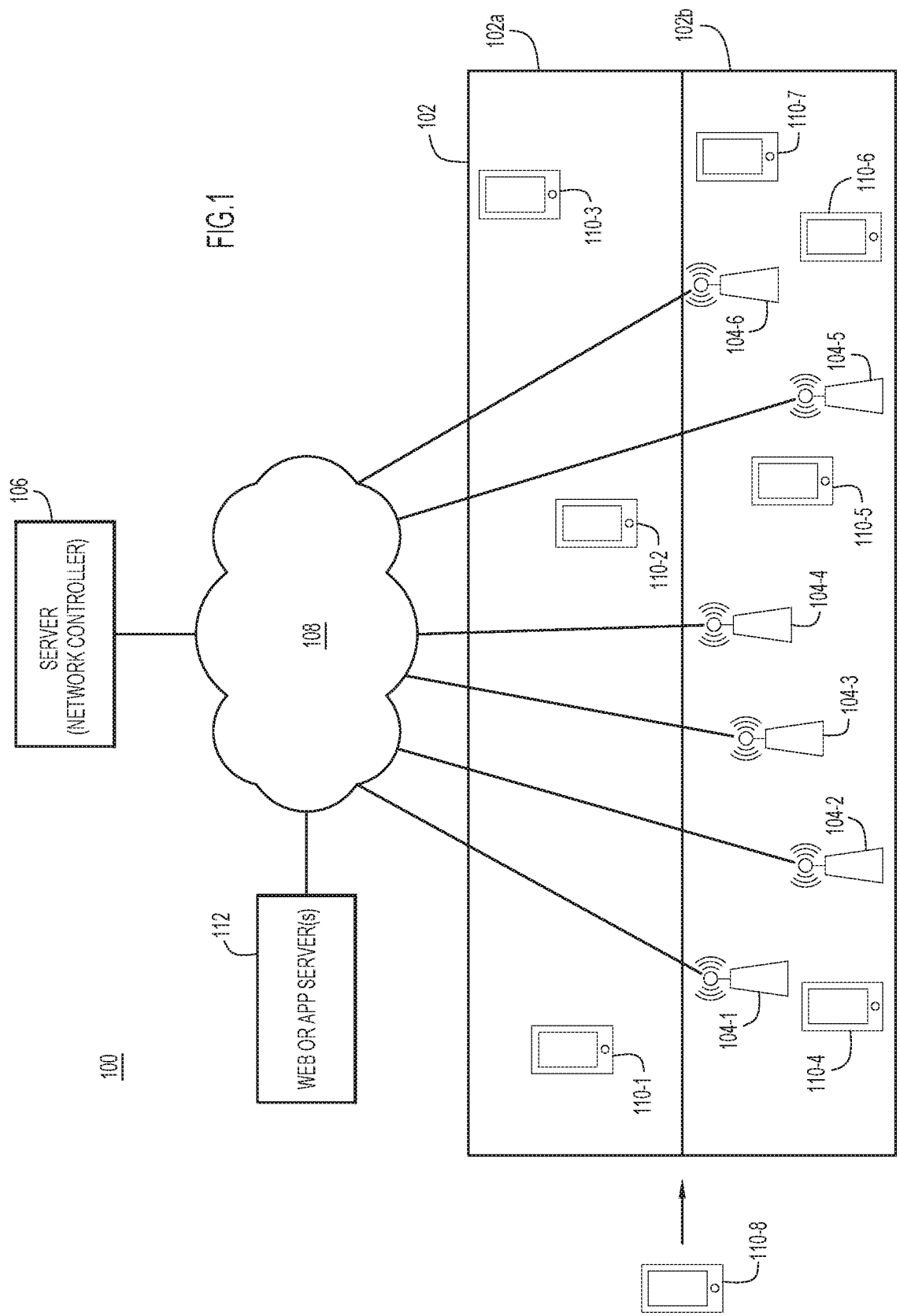
FIG. 1 depicts a system for predicting locations of mobile devices, according to an example embodiment.

Example embodiments will be described with reference to the accompanying figures. Reference is first made to FIG. 1. FIG. 1 illustrates a system 100 for predicting locations of wireless mobile devices, according to an example embodiment. The system 100 is deployed in a location 102 that includes two zones, 102a and 102b. For example, the location 102 may be a train station and zone 102a is a car of a train and zone 102b is a train station platform. In another example, the location 102 may be a shopping mall where zones 102a and 102b are a store and a walkway, respectively. It is to be understood that these examples are provided for illustration and not to limit the scope of the disclosure. In some embodiments, a location may include more than two zones. The system 100 may be applied to any location that has two or more zones. In some embodiments, the zones are adjacent to each other or separated by a small gap region. Further, the shape of the zones is not limited to rectangles. The shape of the zones may be a square, a polygon, a circle, or any other shape.

The system 100 includes a plurality of access points 104-1 to 104-6 (collectively access points 104) disposed at the location 102. The access points 104 are connected to a server 106 that functions as a network controller (e.g., wireless local area network (WLAN) controller) through a network 108. A number of wireless user mobile devices 110-1 to 110-7 (collectively mobile devices 110) are at the location 102 at a time T1. For example, mobile devices 110-1 to 110-3 are located in the zone 102a while mobile devices 110-4 to 110-7 are located in the zone 102b. The mobile devices 110 communicate with the access points 104 (via network controller 106 in some embodiments) to access one or more web or application servers 112 through network 108. It will be apparent to one of ordinary skill in the art that the number of the access points 104, server 106, user mobile devices 110 and the web or application servers 112 are not limited to the specific examples shown in FIG. 1. Any suitable number of those devices may be employed for the techniques disclosed herein.

Techniques disclosed herein use data/information collected by the access points 104 in communication with the mobile devices 110. In some embodiments, the access points 104 collect information regarding the signal strength of signals transmitted from the mobile devices 110 to the access points 104 and information regarding the angle-of-arrival of the signals transmitted by mobile devices 110 and received at the access points 104 (angle-of-arrival (AoA) information). In some embodiments, the signal strength information includes received single strength indication (RSSI). RSSI-based location techniques in indoor positioning systems may achieve location estimates up to 10 meters off from the actual mobile device location, while AoA-based systems have an accuracy of 3 to 4 meters.

Figure 2:
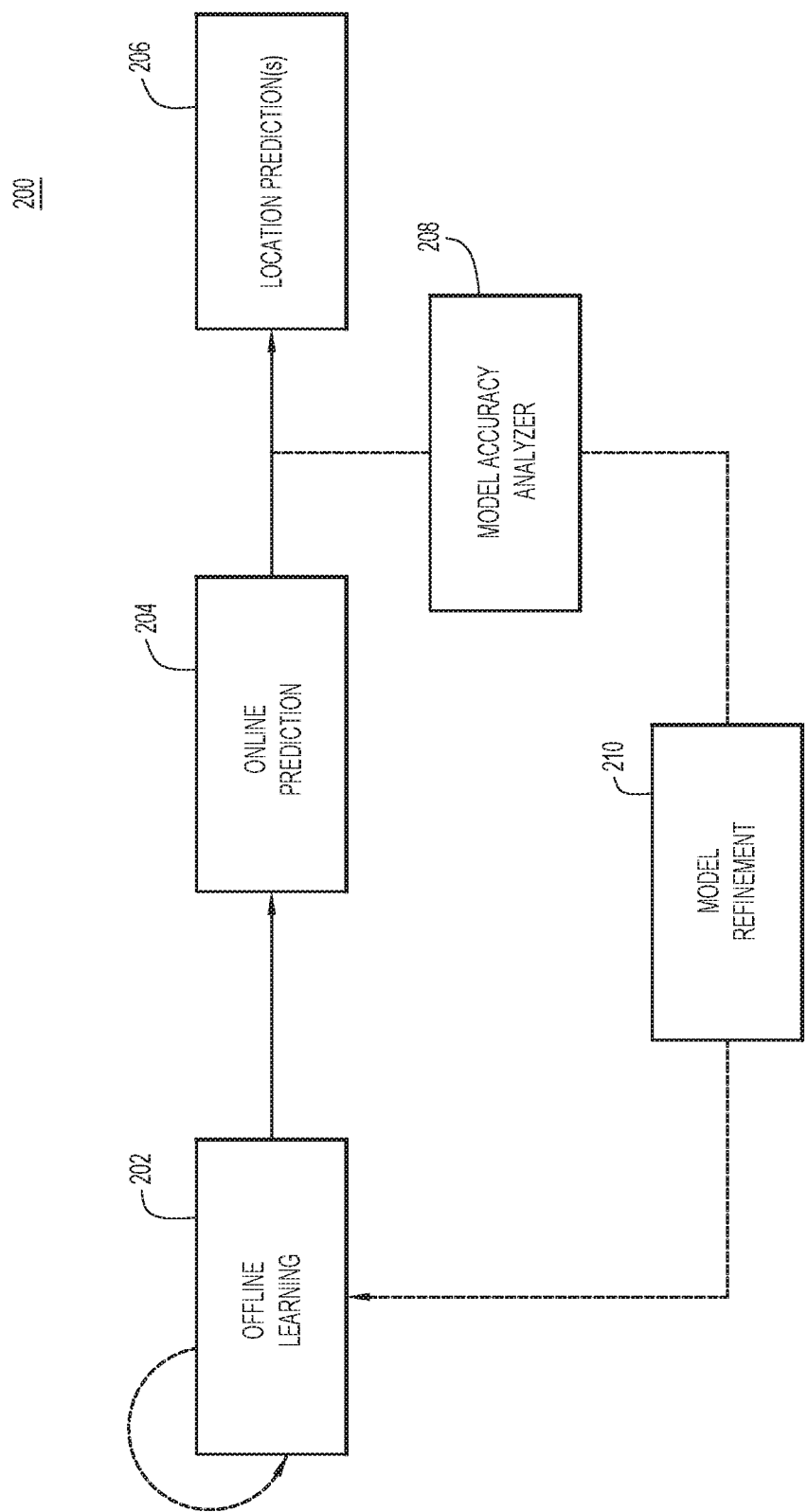
FIG. 2 is a functional diagram of a software process executable by one or more processors of a network controller or server to generate predictions of mobile device locations, according to an example embodiment.

The information collected by the access points 104 is provided to the server 106 for processing and analyzing. Reference is further made to FIG. 2 with continued reference to FIG. 1. FIG. 2 illustrates high-level operations of a software process 200 executable by one or more processors of a network controller, such as the server 106, to generate predictions of mobile device locations, according to an example embodiment. The software process 200 may be stored in one or more non-transitory computer readable storage media. The software process 200 includes an offline learning module 202, an online prediction module 204 that generates location predictions 206 for mobile devices, a model accuracy analyzer 208, and a model refinement module 210. The offline learning module 202 is configured to obtain the signal strength information and angle-of-arrival information collected by the access points 104, and extract features from the information that may indicate whether the mobile devices are more likely in one zone than in one or more other zones. The offline learning module 202 includes a computer learning process that uses the extracted features to generate a software model for classifying a mobile device into one of the two or more zones.

The online prediction module 204 is configured to obtain signal strength information and angle-of-arrival information from the access points 104 communicating with a new mobile device 110-8 that enters the location 102. The online prediction module 204 extracts features from the signal strength information and angle-of-arrival information associated with the new mobile device 110-8 and uses the software model built by the offline learning module 202 to generate a prediction(s) 206 indicating that the new mobile device 110-8 is in, e.g., the zone 102a or zone 102b. Based on the prediction(s) for the new mobile device 110-8, the server 106 takes an action to accommodate the existence of new mobile device 110-8 and/or its user. For example, when it is predicted that the new mobile device 110-8 is in the zone 102a that is a store/merchant, the server 106 may push an advertising message to the new mobile device 110-8 that includes coupons to be used at the store, further illuminate the store in a particular manner, or start playing audio or video in the store. In some embodiments, when it is predicted that the new mobile device 110-8 enters the zone 102a that is a train platform, the server 106 may increase air condition supplied to the platform.

The model accuracy analyzer 208 is configured to analyze the accuracy of the prediction made by the online prediction module 204. In some embodiments, the model accuracy analyzer 208 may obtain and use data to determine an actual location of the new mobile device 110-8. For example, the model accuracy analyzer 208 may receive a user input or data from a detector indicating the actual location of the new mobile device 110-8 so as to determine the accuracy of the prediction.

The model refinement module 210 is configured to refine the software model based on the result of accuracy analysis from the model accuracy analyzer 208. For example, when the prediction is determined to be incorrect, the model refinement module 210 re-characterizes the prediction to the correct location for the new mobile device 110-8 and associates the re-characterized prediction with the extract features such that those extracted features for the new mobile device 110-8 are now associated with the correct location, e.g., in one of the zones 102a and 102b. The model refinement module 210 is further configured to supply the corrected features for the new mobile device 110-8 to the offline learning module 202, which uses the corrected features to modify the software model. The offline learning module 202, the online prediction module 204, the model accuracy analyzer 208, and the model refinement module 210 form a loop to continue refining the software model such that the software model can generate more accurate predictions for any new mobile device that enters the location 102, e.g., predicting in which zone 102a or 102b a new mobile device is located.

Figure 3:
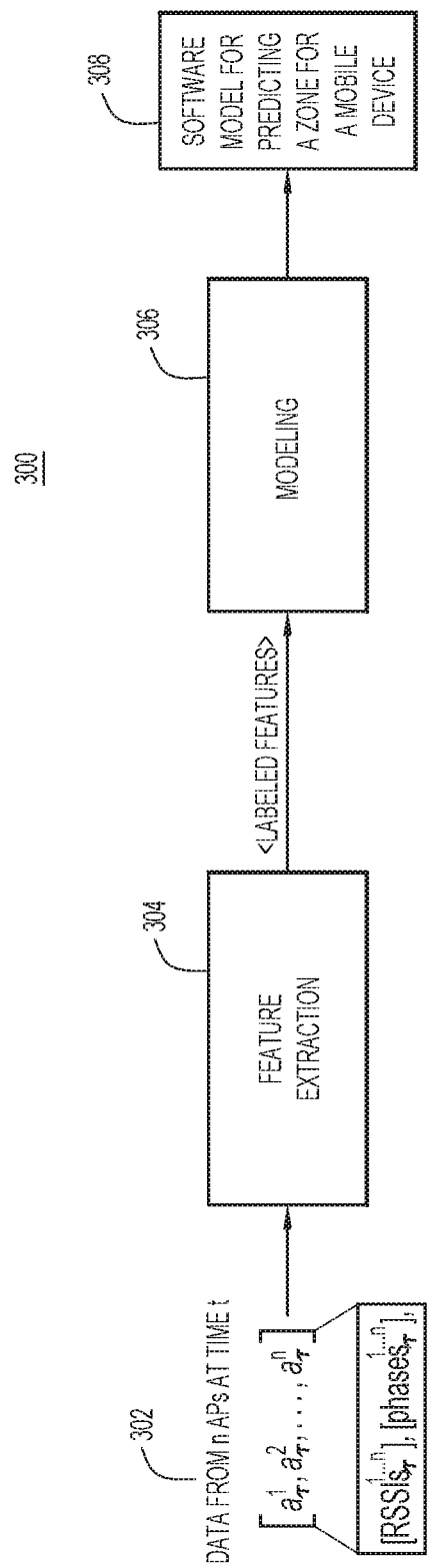
FIG. 3 is a flow diagram depicting a method for conducting an offline learning process to generate a software model for predicting locations for mobile devices, according to an example embodiment.

FIG. 3 illustrates a method 300 for conducting an offline learning process to generate a software model for predicting locations for mobile devices, according to an example embodiment. For example, the method 300 may be executed by the offline learning module 202 in FIG. 2. With reference to FIG. 3 and continued reference to FIG. 1, the method 300 begins at 302 where data associated with mobile devices 110 is obtained from access points 104. The data includes signal strength information and angle-of-arrival information for the mobile devices 110 in communication with the access points 104. In some embodiments, RSSIs and AoA (phase vectors) data associated with a mobile device are obtained at a given time, to identify if the mobile device is in a first zone (e.g., zone 102a) or in a second zone (e.g., zone 102b). At 304, all relevant features that potentially distinguish the mobile device's location as being in the first zone (e.g., zone 102a) or in the second zone (e.g., zone 102b), are extracted. The features are evaluated with various machine learning models to determine which model is best suited for predicting the location of the mobile device. Example features include a fraction of RSSIs that are greater than a threshold value, and a maximum value, a minimum value, an average value, a median value, and a standard deviation value of RSSIs from the access points 104.

In some embodiments, the access points 104 deployed in the zones periodically generate RSSI data with respect to signals received from the mobile devices 110. If there are n access points (APs), at any given time t, the AP data for each mobile device can be expressed as $[a_t^1, a_t^2, \ldots, a_t^n]$. If the RSSI data is collected for an independent variable as per AP data, a software model would depend on how the APs are deployed, which could be different for different deployments. For example, if a location has 6 APs, it would have a different model than a location with 10 APs. The techniques disclosed herein generate deployment independent solutions. To achieve this goal, example features include statistics, such as a maximum value, a minimum value, an average, a median, and a standard deviation of RSSIs across the APs 104. In some embodiments, it can assumed that weaker signal strengths are detected from zone 102a when all of the APs are deployed in zone 102b as shown in FIG. 1. In some embodiments, all of the APs may be deployed at an edge portion of zone 102b to improve feature extraction. Other example features may include a report of a fraction of detected RSSIs greater than a predetermined thresholds (e.g., in dBm, −75, −70, −65, −55 or −45).

In some embodiments, the extracted features may be presented as parallel coordinates. For example, the extracted features may be expressed in a multidimensional visualization to depict features along with the labels (in zone 102a or zone 102b). This helps to visualize a trend of RSSI-based features for mobile devices located in zone 102a or zone 102b. A result from the multidimensional visualization indicates that no single feature or a subset of RSSI features is determinative for deciding whether a mobile device is in zone 102a or zone 102b.

In some embodiments, each of the access points 104 includes a plurality of antennas for generating angle-of-arrival data. For example, each AP may include 16, 32, or other suitable number of antennas for generating angle-of-arrival data. In some embodiments, each AP computes a phase vector with respect to signals received at its antennas from each mobile device at the location 102. In some embodiments, a phase vector may be partial, i.e., the phase vector may not have data from some of the antennas. Based on the computed phase vectors, example features for angle-of-arrival data may include a maximum value, a minimum value, an average value, a median value, and a standard deviation over the phase vectors across the APs 104. In some embodiments, the average phase fraction is generally greater for zone 102b where all of the APs 104 are deployed than for zone 102a. A result from a multidimensional visualization indicates that no single feature or a subset of angle-of-arrival features is determinative for deciding whether a mobile device is in zone 102a or zone 102b.

Results from the feature extraction process at 304 include labeled features which associate an extracted feature with a location (e.g., zone 102a or zone 102b). For example, a labeled feature $<F_p^1$, zone 102a> indicates that a feature $F_p^1$ detected at time p is associated with zone 102a.

At 306 a software model is generated based on the labeled features from the feature extraction 304. In some embodiments, once the features are extracted, the features are scaled to a range [0,1] before applying a model to classify a mobile device as being in a zone of the location 102. For example, the software model may employ a machine learning model that may be a support vector machine, a decision tree model, a random forest model, a logistic regression model, a Naïve Bayes model, etc. or a combination of models. The labeled features are supplied to a machine learning model and at 308, the software model is generated for use in predicting a zone in which a mobile device is located.

Figure 4:
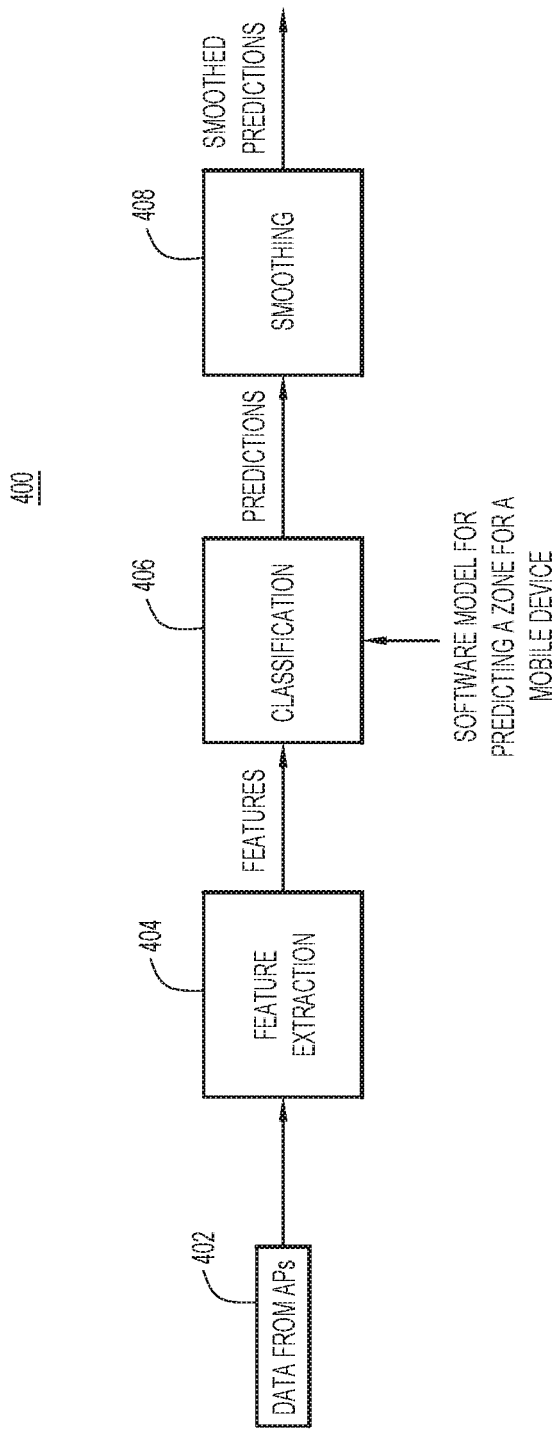
FIG. 4 is a flow diagram depicting a method for conducting an online prediction process using the software model for generating location predictions for mobile devices, according to an example embodiment.

FIG. 4 illustrates a method 400 for conducting an online prediction process for generating a prediction of a zone for mobile devices, according to an example embodiment. For example, the method 400 may be executed by the online prediction module 204 in FIG. 2. With reference to FIG. 4 and continued reference to FIG. 1, the method 400 begins at 402 where the data associated with a new mobile device 110-8 is obtained from access points 104. The mobile device 110-8 is considered "new" because it just enters the location 102. The data includes signal strength information and angle-of-arrival information associated with the mobile device 110-8 in communication with the access points 104.

At 404, all relevant features that potentially distinguish the mobile device's location in zone 102a or zone 102b, are extracted from the obtained data. Similar to 304 in FIG. 3, example features that can be extracted from the data include a fraction of RSSIs that are greater than a threshold value, and a maximum value, a minimum value, an average value, a median value, and a standard deviation value of RSSIs from the APs 104. Example features may also include a maximum value, a minimum value, an average value, a median value, and a standard deviation over phase vectors across the APs 104.

At 406, the software model generated at 306 (FIG. 3) is employed to process the extracted features for the new mobile device 110-8. The features extracted at 404 are supplied to the software model to generate a prediction for the mobile device 110-8. In some embodiments, a prediction is near real-time and is generated periodically, e.g., every 10 seconds. Depending on the extracted features, the predictions for the mobile device 110-8 may not be consistent. In some embodiments, a weighted majority voting/smoothing process 408 is applied to the predictions generated at 406. For example, when the predictions indicate the presence of a mobile device alternating between zone 102a and zone 102b, the weighted majority voting process 408 may modify some of the predictions based on whether a majority of predictions indicating that the mobile device is in a particular zone, e.g., zone 102a. That is, the predictions indicating the mobile device is in zone 102b are modified to indicate the mobile device is located in zone 102a. This reduces the possibility of inconsistent predictions or "jumpiness" in the predictions.

In some embodiments, a prediction by the software model may include coordinates indicating where a mobile device is located. A correction for a location prediction may be based on the coordinates of a mobile device. For example, if a mobile device is predicted as being located in zone 102a while the coordinates of the mobile device indicate it is located in zone 102b, the prediction for the mobile device can be corrected as indicating the mobile device is located in zone 102b.

Figure 5:
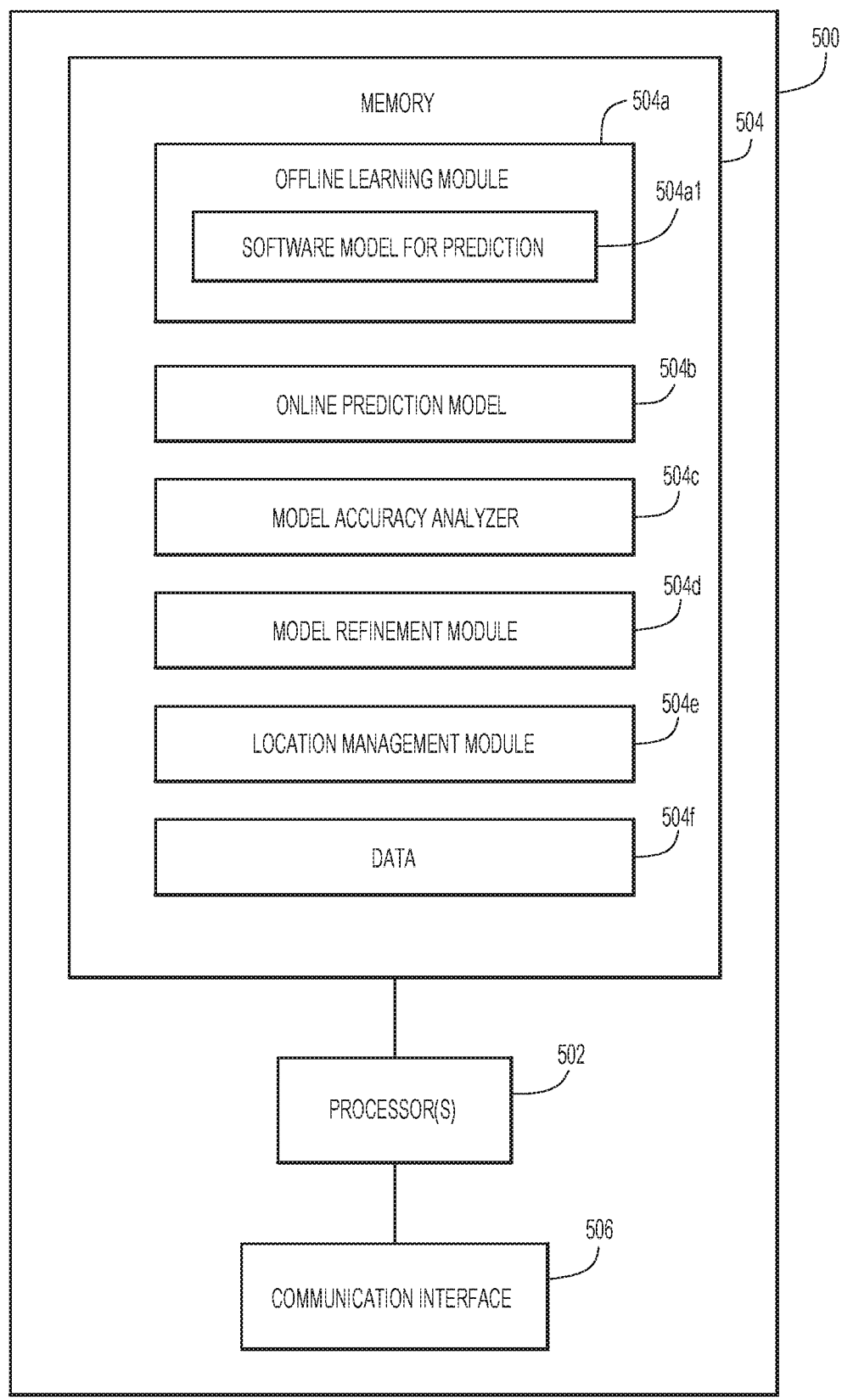
FIG. 5 is a block diagram of a server configured to generate location predictions for mobile devices, according to an example embodiment.

FIG. 5 depicts a block diagram of a server 500, such as server/network controller 106 shown in FIG. 1, for generating predictions for locations of mobile devices, according to one example embodiment. The server 500 includes a processor 502, a memory 504, and a communication interface 506. The processor 502 may be a microprocessor or microcontroller (or multiple instances of such components) that is configured to execute program logic instructions (i.e., software modules) for carrying out various operations and tasks described herein. For example, the processor 502 is configured to execute instructions stored in the memory 504 for extracting features from data obtained by APs in communication with mobile devices, generating a software model for predicting a location for a mobile device, refining the software model with location information of the mobile device, and other operations disclosed herein.

The memory 504 may include read-only memory (ROM), random access memory (RAM), magnetic disk storage media devices, optical storage media devices, flash memory devices, electrical, optical or other physical/tangible memory storage devices. The memory 504 stores instructions for an offline learning module 504a for obtaining signal strength information and angle-of-arrival information from a plurality of access points disposed at a location, and instructions for extracting features from the received information, and generating a software model 504a1 for classifying a mobile device into a zone at the location by applying a computer learning process to the extracted features. The memory 504 also stores instructions for an online prediction module 504b for obtaining signal strength information and angle-of-arrival information from the access points in communication with a new mobile device entering the location, extracting features from the received information, and generating a prediction of a location for the new mobile device using the software model 504a1.

The memory 504 further stores instructions for a model accuracy analyzer 504c for analyzing the accuracy of the predictions generated by the online prediction module 504b, and instructions for a model refinement module 504d for correcting inaccurate predictions and supplying the corrected predictions to the offline learning modules 504a for modifying the software model 504a1. Moreover, the memory 504 stores instructions for a location management module 504e configured to take an action at the location based on the predictions indicating the zones in which mobile devices are located. The memory 504 also stores data 504f for various operations performed by the server 500. For example, data 504f includes signal strength information and angle-of-arrival information obtained by APs, extracted features, labeled features, location predictions, and location information of mobile devices.

The functions of the processor 502 may be implemented by logic encoded in one or more tangible (non-transitory) computer-readable storage media (e.g., embedded logic such as an application specific integrated circuit, digital signal processor instructions, software that is executed by a processor, etc.), wherein the memory 504 stores data used for the operations described herein and stores software or processor executable instructions that are executed to carry out the operations described herein.

In one embodiment, the processor 502 may be embodied by digital logic gates in a fixed or programmable digital logic integrated circuit, which digital logic gates are configured to perform operations described herein. In general, the offline learning module 504a, the online prediction module 504b, the model accuracy analyzer 504c, the model refinement module 504d, and the location management module 504e may be embodied in one or more computer-readable storage media encoded with software comprising computer executable instructions and when the software is executed operable to perform the operations described herein.

The communication interface 506 is configured to transmit communications to, and receive communications from, a computer network for the server 500. In one example, the communication interface 506 may take the form of one or more network interface cards.

Figure 6:
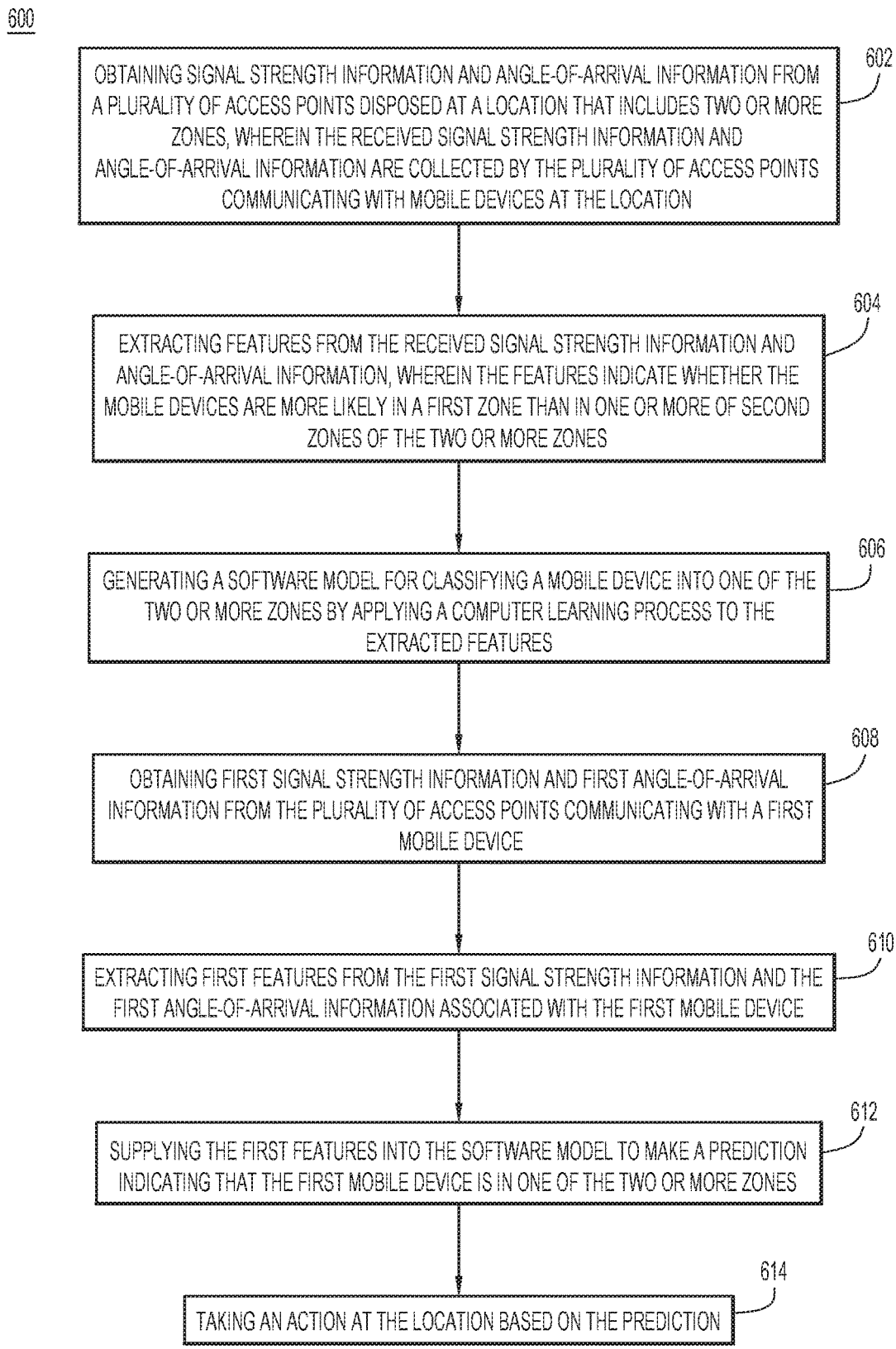
FIG. 6 is a flow chart illustrating a method for generating a location prediction for a mobile device in order to take action at a location, according to an example embodiment.

FIG. 6 is a flow chart illustrating a method 600 for generating a location prediction for a mobile device in order to take action at a location, according to one example embodiment. For example, the method 600 can be performed by a server, such as the server/network controller 106 shown in FIG. 1. At 602, the server obtains signal strength information and angle-of-arrival information from a plurality of access points disposed at the location that includes two or more zones. The obtained signal strength information and angle-of-arrival information are collected by the plurality of access points communicating with mobile devices at the location. In some embodiments, the plurality of access points is disposed at an edge portion of one of the two or more zones. At 604, the server extracts features from the obtained signal strength information and angle-of-arrival information. The features indicate whether the mobile devices are more likely in a first zone than in one or more of second zones of the two or more zones. In some embodiments, no single feature or a set of features are determinative for deciding the exact zones that the mobile devices are located. In some embodiments, the extracted features include a maximum value, a minimum value, an average value, a median value, and/or a standard deviation value of RSSIs from the plurality of access points. In some embodiments, the extracted features include a fraction of RSSIs that are greater than a threshold value. In some embodiments, each of the plurality of access points includes a plurality of antennas, and the angle-of-arrival information includes phase vectors for the mobile devices obtained from signals received by the antennas at each of the plurality of access points. In some embodiments, the extracted features include a maximum value, a minimum value, an average value, a median value, and/or a standard deviation value of the phase vectors.

At 606, the server generates a software model for classifying a mobile device into one of the two or more zones by applying a computer learning process to the extracted features. In some embodiments, the computer learning process may use one or more of a support vector machine, a decision tree model, a random forest model, a logistic regression model, a Naïve Bayes model, etc. At 608, the server obtains first signal strength information and first angle-of-arrival information from the plurality of access points communicating with a first mobile device. This first mobile device is carried by a user entering the location and the location (zone location) of the first mobile device has not been classified/predicted. The server is configured to predict a location (which one of the zones) for the first mobile device based on the obtained information. At 610, the server extracts first features from the first signal strength information and the first angle-of-arrival information associated with the first mobile device. The extracted first features may be similar to those extracted at 604. At 612, the server supplies the first features into the software model to generate a prediction indicating that the first mobile device is in one of the two or more zones. At 614, the server takes an action at the location based on the prediction. For example, when it is predicted that the first mobile device moves from a first zone to a second zone, an air conditioning/ventilation system may be controlled to reduce the air conditioning supplied at the first zone and increase air conditioning supplied at the second zone. In some embodiments, when it is predicted that the first mobile device is in a zone that is a store/merchant, the server may send an advertising message to the first mobile device, further activate illumination in the store, or start playing audio or video by a device in the store. In some embodiments, when it is predicted that the first mobile device enters a particular zone that is a train platform, the server may increase air conditioning supplied to the platform. Any other suitable action may be taken by the server to provide a service to the user of the first mobile device based on the prediction.

Figure 7:
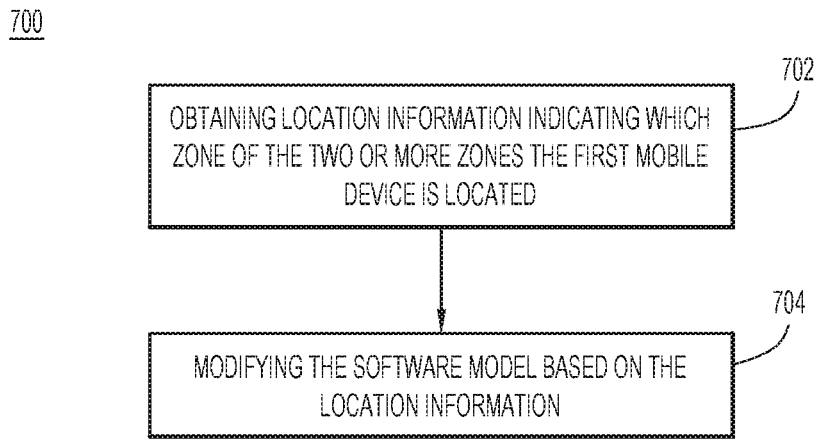
FIG. 7 is a flow chart illustrating a method for modifying a software model for generating location predictions for mobile devices, according to an example embodiment.

FIG. 7 is a flow chart illustrating a method 700 for modifying a software model for generating location predictions for mobile devices, according to one example embodiment. For example, the method 700 can be performed by a server, such as the server/network controller 106 in FIG. 1. At 702, the server obtains location information indicating in which zone of the two or more zones the first mobile device is located. For example, the server may obtain the location information generated by a sensor or detector that unequivocally identifies the exact zone in which the first mobile device is located. In some embodiments, the location information may be provided by a system administrator who receives intelligence for the location of the first mobile device. In some embodiments, the server may obtain location data for the first mobile device and derive the exact location of the first mobile device from the location data. At 704, based on the location information, the server modifies the software model for generating location predictions for mobile devices. For example, the server may modify an inaccurate prediction to indicate the correct location of the first mobile device based on the location information. In some embodiments, modifying an inaccurate prediction includes modifying a labeled feature that associates the first mobile device with a particular zone at the location. The modified labeled feature is supplied to the computer learning process to refine the software model. The loop of refining the software model can improve its accuracy in generated predictions for new mobile devices.

Figure 8:
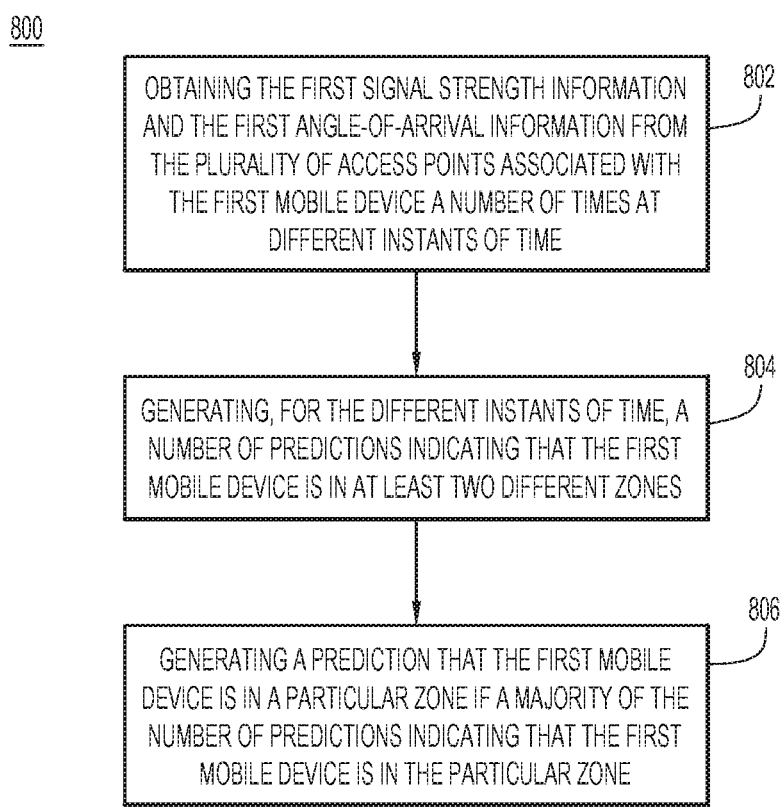
FIG. 8 is a flow chart illustrating a method for generating location predictions of a mobile device at different time instants, according to an example embodiment.

FIG. 8 is a flow chart illustrating a method 800 for generating location predictions at different time instants for a mobile device, according to one example embodiment. For example, the method 800 can be performed by a server, such as the server/network controller 106 shown in FIG. 1. At 802, the server obtains the signal strength information and the angle-of-arrival information from the plurality of access points associated with the mobile device at a number of instants of time. At 804, the server generates, for the different instants of time, a number of predictions indicating that the mobile device is in at least two different zones. At 806, the server generates a prediction that the first mobile device is in a particular zone if a majority of the number of predictions indicating that the first mobile device is in the particular zone. For example, in four consecutive predictions, the third prediction may be different from the other three. Because the majority of the predictions indicate first mobile device is in a particular zone, it is likely that the intervening, inconsistent third prediction would be incorrect. A weighted majority voting can be applied to modify the inconsistent prediction such that it also indicates that the first mobile device is in the particular zone.

The techniques provided herein allow a server/network controller to distinguish locations of mobile devices in at least two adjacent zones and take one or more actions based on the locations of mobile devices, without sacrificing the privacy of the users of the mobile devices. The techniques use a machine learning process to generate a software model that can generate location predictions indicating which zone a mobile device is located. Location information of the mobile devices may be supplied to the server to refine the software model to increase prediction accuracy.

In some embodiments, the techniques can be employed to manage a public transportation system. One of the use cases of these techniques is for determining the locations of mobile devices to improve user experience of public transportation services. Modern transportation facilities are generally equipped with Wi-Fi® wireless local area network (WLAN) technologies. Several transportation use cases can be enabled via indoor positioning systems deployed at commuter train stations. Those use cases may include adaptive scheduling of subways and commuter trains based on traffic, generating analytics such as determining traffic in each commute direction or traffic during a weekday and a weekend, efficient and cost effective air conditioning systems on stations and trains based on the commuter counts, as well as emergency preparedness and evacuation planning. In some embodiments, the techniques for determining the locations of user mobile devices enable an effective and safe experience for daily commuters, and could save operational costs for managing public transportation services.

Figure 9:
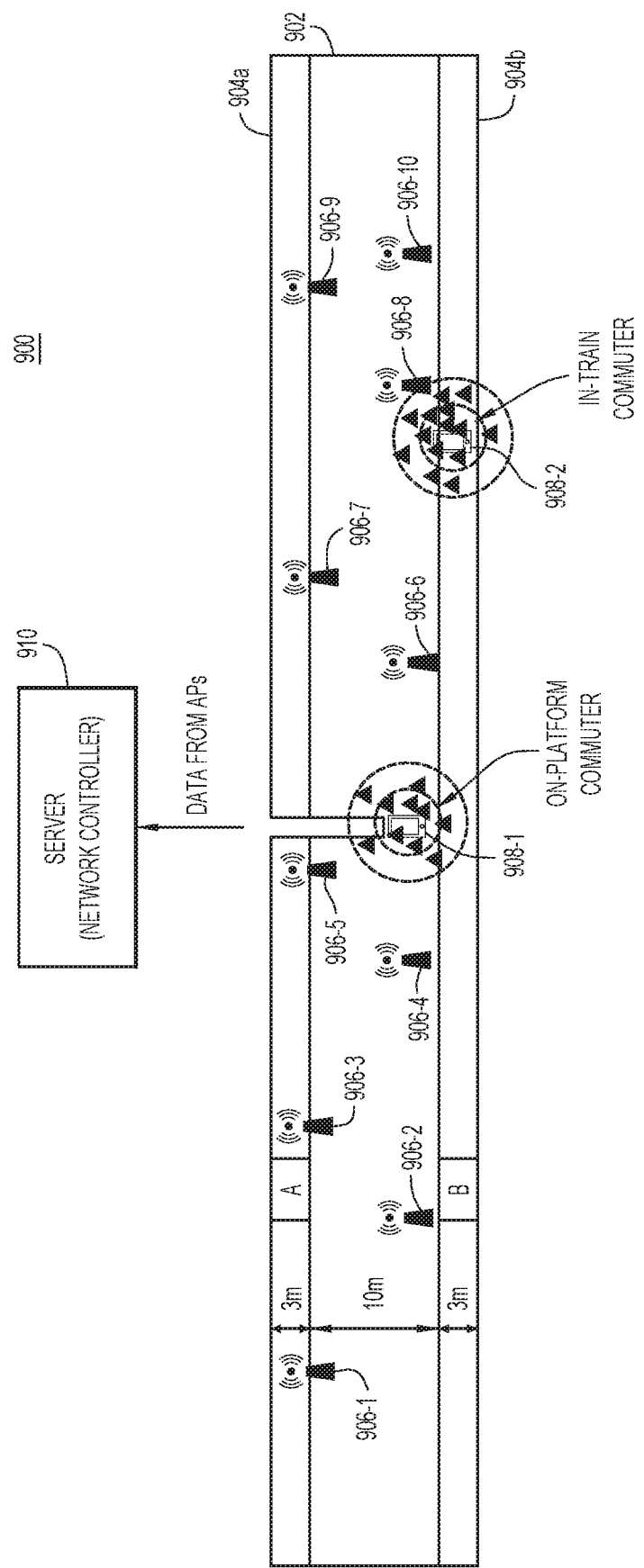
FIG. 9 is a schematic diagram illustrating a commuter train station in which the techniques for location predictions for mobile devices can be deployed, according to an example embodiment.

In one example, transportation agencies are interested in analytics based on the accurate head counts of commuters waiting for trains on each station. Further understanding the head count of commuters waiting for a train in each direction would also be insightful. Reference is now made to FIG. 9. FIG. 9 illustrates a commuter train station 900 in which the techniques disclosed above can be deployed, according to one example embodiment. The station 900 includes a platform 902 that is narrow and long. The platform 902 also has access to stairs, escalators, and/or elevators. From time-to-time, the train station 900 may also include one or more trains 904a and 904b arriving at opposite sides of the platform 902. In general, the trains 904a and 904b are also narrow and long. In one example, the platform 902 may have a width of 10 meters while each of the trains 904a and 904b has a width of 3 meters. A plurality of access points 906-1 to 906-10 (collectively access points 906) are deployed at an edge portion of the platform 902. Two mobile devices 908-1 and 908-2 are shown in FIG. 9, where mobile device 908-1 is located on the platform 902 and mobile device 908-2 is located in the train 904b. It is to be understood that any number of mobile devices may be present at the station 900.

A conventional RSSI-based indoor positioning system would generate location estimates (depicted as triangles) that can be up to 10 meters off from the actual device location (shown with solid-line circles). An AoA-based indoor positioning system has an accuracy of 3 to 4 meters (shown with dashed-line circles). Moreover, the majority of the commuters wait closer to the edge of the platform 902 on the side where their respective destination trains may arrive, rather than towards the center of the platform 902. As a result, a conventional indoor positioning system would estimate device locations at the edge of the platform 902 to spillover to the trains 904a or 904b. Due to such limitations of the indoor positioning systems and the narrow structures of the train platform 902 and the trains 904a and 904b, a conventional indoor positioning systems can distinguish, with poor accuracy, a location as being either on-platform or in-train. It has been determined through experimentation that the percentage of correctly placed on-platform mobile devices is 68% by an RSSI-based system, and 86% for an AoA-based system. Due to the narrower width of trains, the percentages of correctly placed in-train mobile devices are 31% for an RSSI-based system and 50% for an AoA-based system. The techniques disclosed herein may improve the accuracy of location estimate/prediction indicating whether a mobile device/user is in-train or on-platform. In some embodiments, the on-platform prediction accuracy is more than 90% and the in-train prediction accuracy is more than 80% using the above-disclosed techniques.

In some embodiments, the on-platform versus in-train classification is conducted using passively-sensed RSSI and AoA (phase vectors) data obtained by a server 910 from tracked user devices 908 via the access points 906. For example, in an offline learning stage, the server 910 extracts features from the RSSI and AoA data and uses machine learning models that enable on-platform vs. in-train classification. In some embodiments, the server 910 extracts all relevant features that can potentially distinguish between on-platform locations and in-train locations. The features are evaluated with various machine learning models to generate a software model that is suitable for generating location predictions for the mobile devices. The generated software model is then deployed to any train station for managing operations at the train station.

In a deployment, the current status of the tracked mobile device is predicted in real-time. RSSI and AoA data associated with mobile devices entering that station is processed to extract features similar to those extracted during the offline learning stage to help distinguish between on-platform locations and in-train mobile locations. The software model is used to classify the status (i.e., on-platform or in-train) of the mobile devices. The predictions are made for each instance of input data received from the APs. In some embodiments, when a number of consecutive predictions for a mobile device may jump between on-platform and in-train, a weighted majority voting process can be applied to the predictions to mitigate the jumpiness.

In some embodiments, a positioning system consistent with the embodiments of this disclosure is integrated in two ways, namely, (1) status notifications, and (2) X-Y coordinate correction. When implemented to notify a location status, the status is updated periodically based on data collected by APs. When X-Y coordinate correction is applied, a location of a mobile device is corrected based on an X-Y coordinates of the mobile device.

Figure 10:
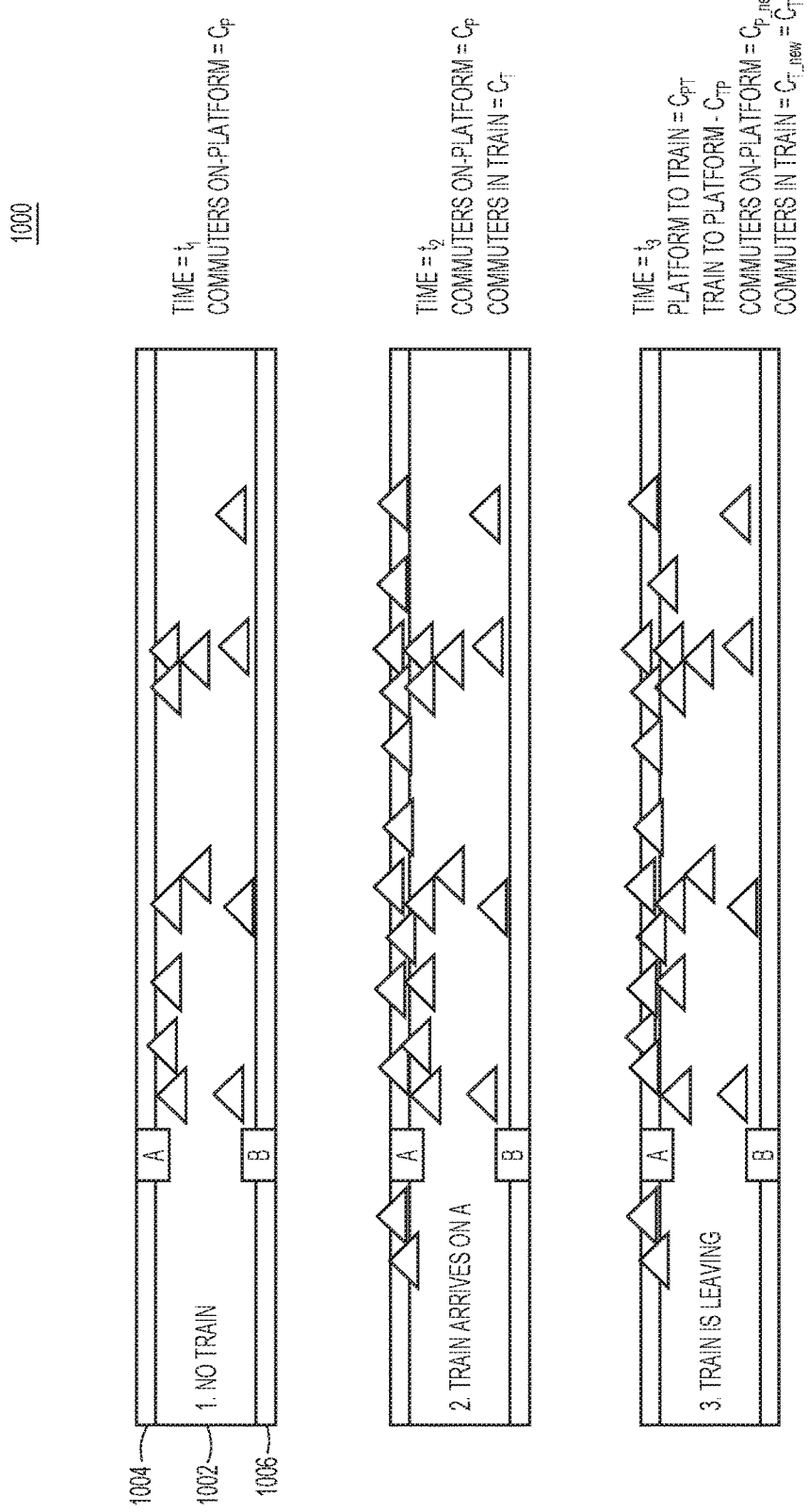
FIG. 10 is a schematic diagram illustrating a train station environment in which the location prediction techniques are performed at different time instants, according to an example embodiment.

The software model can be refined based on accuracy analyses on the predictions. An example is now described with reference to FIG. 10. FIG. 10 is a diagram illustrating a train station 1000 at times t1, t2, and t3, according to an example embodiment. The train station 1000 includes a platform 1002, a track A 1004 to the north of the platform 1002, and a track B 1006 to the south of the platform 1002. At time t1, no train is arrived at the station 1000. All of the commuters are on the platform 1002. A server uses the software model to generate predictions for the mobile devices carried by commuters/users on the platform 1002 at time t1. The predictions at this time should indicate that all of the mobile devices are on platform 1002. Any inconsistent prediction can be corrected. The number of commuters on-platform is expressed as $C_P$.

At time t2, a train arrives at the platform 1002 from track 1004. Before the doors of the train are opened, the number of the commuters in-train can be expressed as $C_T$. At time t3, the train is leaving the station 1000. Between times t2 and t3, some commuters ($C_{PT}$) move from the platform to the train while some commuters ($C_{TP}$) move from the train to the platform. At time t3, a number of the commuters on-platform becomes $C_{P\text{-}new}=C_P+C_{TP}-C_{PT}$, while a number of commuters in-train becomes $C_{T\text{-}new}=C_T+C_{PT}-C_{TP}$. The head counts can be computed at certain intervals such that they can be correlated with no train (t1), train arrival (t2), and train departure (t3). These head counts (location information of mobile devices) are provided to the server to analyze the accuracy of the predictions by the software model. The media access control (MAC) addresses of the mobile user devices can be employed to determine which devices are moving from the platform to the train and which are moving from the train to the platform.

In some embodiments, several servers at different locations may communicate location information of mobile devices to each other for refining the software model deployed at those locations. An example is described with reference to FIG. 11. FIG. 11 is a diagram showing a system 1100 for refining software models for location predictions of mobile devices, according to one example embodiment. At station 1110, a server A 1112 is deployed. The server 1112 operates a software model 1114 for location prediction of mobile devices. Similarly, at station 1120, a server B 1122 is deployed. The server 1122 operates a software model 1124 for location prediction of mobile devices. The servers 1112 and 1122 are in communication with each other through a network (not shown). At time t10, a train is at the station 1110. The software model 1114 generates predictions indicating that mobile device 1130 is on the platform of the station 1110 and that mobile device 1140 is on the train heading to the station 1120. When the train arrives at the station 1120 at time t11, the server 1122 may obtain location information indicating that the mobile device 1130 is present at the station 1120 but the mobile device 1140 is not present at the station 1120. The server 1122 is configured to communicate the location information to the server 1112 at the station 1110 such that server 1112 can perform an accuracy analysis on the predictions for the mobile devices 1130 and 1140. Based on the accuracy analysis, the server 1112 can modify the software model 1114 to improve its prediction accuracy.

The techniques presented herein enhance a positioning system that may be deployed, for example, in urban transportation centers by enabling predictions for commuter/mobile device location (e.g., in-train, on-platform). These techniques can distinguish in-train vs. on-platform commuters in real-time based on Wi-Fi data (RSSI and AoA phase vectors) based on signals received at Wi-Fi access points from the mobile devices. The techniques enable urban transportation analytics, such as commuter head counts waiting on stations, commuters on trains in either direction, commuter traffic between two stations, etc. The techniques enable a transportation management system to take one or more actions based on the location predictions for the commuters/mobile devices.

In summary, in one form, a method is provided, which comprises: obtaining, at a network controller, signal strength information and angle-of-arrival information from a plurality of access points deployed at a location that includes two or more zones, wherein the obtained signal strength information and angle-of-arrival information are collected by the plurality of access points communicating with mobile devices at the location; extracting features from the obtained signal strength information and angle-of-arrival information, wherein the features indicate whether the mobile devices are more likely in a first zone than in one or more of second zones of the two or more zones; generating a software model for classifying a mobile device into one of the two or more zones by applying a computer learning process to the extracted features; obtaining first signal strength information and first angle-of-arrival information from the plurality of access points communicating with a first mobile device; extracting first features from the first signal strength information and the first angle-of-arrival information associated with the first mobile device; supplying the first features to the software model to generate a prediction indicating that the first mobile device is in one of the two or more zones; and performing an action at the location based on the prediction of the location of the first mobile device.

In another form, an apparatus is provided. The apparatus includes a network interface that enables network communications, a processor, and a memory to store data and instructions executable by the processor. The processor is configured to execute the instructions to: obtain signal strength information and angle-of-arrival information from a plurality of access points disposed at a location that includes two or more zones, wherein the obtained signal strength information and angle-of-arrival information are collected by the plurality of access points communicating with mobile devices at the location; extract features from the obtained signal strength information and angle-of-arrival information, wherein the features indicate whether the mobile devices are more likely in a first zone than in one or more of second zones of the two or more zones; generate a software model for classifying a mobile device into one of the two or more zones by applying a computer learning process to the extracted features; obtain first signal strength information and first angle-of-arrival information from the plurality of access points communicating with a first mobile device; extract first features from the first signal strength information and the first angle-of-arrival information associated with the first mobile device; supply the first features to the software model to generate a prediction indicating that the first mobile device is in one of the two or more zones; and perform an action at the location based on the prediction of the location of the first mobile device.

In yet another form, one or more non-transitory computer-readable storage media are encoded with software comprising computer executable instructions which, when executed by a processor, cause the processor to: obtain signal strength information and angle-of-arrival information from a plurality of access points disposed at a location that includes two or more zones, wherein the obtained signal strength information and angle-of-arrival information are collected by the plurality of access points communicating with mobile devices at the location; extract features from the obtained signal strength information and angle-of-arrival information, wherein the features indicate whether the mobile devices are more likely in a first zone than in one or more of second zones of the two or more zones; generate a software model for classifying a mobile device into one of the two or more zones by applying a computer learning process to the extracted features; obtain first signal strength information and first angle-of-arrival information from the plurality of access points communicating with a first mobile device; extract first features from the first signal strength information and the first angle-of-arrival information associated with the first mobile device; supply the first features to the software model to generate a prediction indicating that the first mobile device is in one of the two or more zones; and perform an action at the location based on the prediction of the location of the first mobile device.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:

obtaining, at a network controller, signal strength information and angle-of-arrival information from one or more access points deployed at a location that includes two or more zones, wherein the signal strength information and angle-of-arrival information are collected by the one or more access points communicating with mobile devices at the location;

extracting features from the signal strength information and angle-of-arrival information, wherein the features indicate whether the mobile devices are more likely in a first zone than in one or more of second zones of the two or more zones;

generating a software model for classifying a mobile device into one of the two or more zones by applying a computer learning process to the features;

obtaining first signal strength information and first angle-of-arrival information from the one or more access points communicating with a first mobile device at a number of different instants of time;

extracting first features from the first signal strength information and the first angle-of-arrival information associated with the first mobile device;

supplying the first features to the software model to generate, for the number of different instants of time, a number of predictions indicating that the first mobile device is in at least two different zones;

generating a prediction that the first mobile device is in a particular zone based on a majority of the number of predictions indicating that the first mobile device is in the particular zone; and performing an action at the location based on the prediction that the first mobile device is in the particular zone.

2. The method of claim 1, further comprising:

obtaining location information indicating in which zone of the two or more zones the first mobile device is located; and modifying the software model based on the location information.

3. The method of claim 1, wherein the features include a maximum value, a minimum value, an average value, a median value, and a standard deviation value of received signal strength indications from the one or more access points.

4. The method of claim 1, wherein the features include a fraction of received signal strength indications that are greater than a threshold value.

5. The method of claim 1, wherein at least one of the one or more access points is disposed at an edge portion of one of the two or more zones.

6. The method of claim 1, wherein performing the action at the location comprises controlling a climate control system servicing the location.

7. The method of claim 1, wherein performing the action at the location comprises altering a number of public transportation vehicles servicing the location.

8. The method of claim 1, wherein performing the action at the location comprises determining an evacuation plan for the location.

9. An apparatus comprising:
a network interface that enables network communications;
a processor; and
a memory to store data and instructions executable by the processor,
wherein the processor is configured to execute the instructions to:
obtain signal strength information and angle-of-arrival information from one or more access points disposed at a location that includes two or more zones, wherein the signal strength information and angle-of-arrival information are collected by the one or more access points communicating with mobile devices at the location;
extract features from the signal strength information and angle-of-arrival information, wherein the features indicate whether the mobile devices are more likely in a first zone than in one or more of second zones of the two or more zones;
generate a software model for classifying a mobile device into one of the two or more zones by applying a computer learning process to the features;
obtain first signal strength information and first angle-of-arrival information from the one or more access points communicating with a first mobile device at a number of different instants of time;
extract first features from the first signal strength information and the first angle-of-arrival information associated with the first mobile device;
supply the first features to the software model to generate, for the number of different instants of time, a number of predictions indicating that the first mobile device is in at least two different zones;
generate a prediction that the first mobile device is in a particular zone based on a majority of the number of predictions indicating that the first mobile device is in the particular zone; and
perform an action at the location based on the prediction that the first mobile device is in the particular zone.

10. The apparatus of claim 9, wherein the processor is configured to execute the instructions to:
obtain location information indicating in which zone of the two or more zones the first mobile device is located; and
modify the software model based on the location information.

11. The apparatus of claim 9, wherein the features include a maximum value, a minimum value, an average value, a median value, and a standard deviation value of received signal strength indications from the one or more access points.

12. The apparatus of claim 9, wherein the features include a fraction of received signal strength indications that are greater than a threshold value.

13. The apparatus of claim 9, wherein at least one of the one or more access points is disposed at an edge portion of one of the two or more zones.

14. The apparatus of claim 9, wherein the processor is configured to execute the instructions to perform the action at the location based on the prediction that the first mobile device is in the particular zone by controlling a climate control system servicing the location.

15. One or more non-transitory computer-readable storage media encoded with software comprising computer executable instructions which, when executed by a processor, cause the processor to:
obtain signal strength information and angle-of-arrival information from one or more access points disposed at a location that includes two or more zones, wherein the signal strength information and angle-of-arrival information are collected by the one or more access points communicating with mobile devices at the location;
extract features from the signal strength information and angle-of-arrival information, wherein the features indicate whether the mobile devices are more likely in a first zone than in one or more of second zones of the two or more zones;
generate a software model for classifying a mobile device into one of the two or more zones by applying a computer learning process to the features;
obtain first signal strength information and first angle-of-arrival information from the one or more access points communicating with a first mobile device at a number of different instants of time;
extract first features from the first signal strength information and the first angle-of-arrival information associated with the first mobile device;
supply the first features to the software model to generate, for the number of different instants of time, a number of predictions indicating that the first mobile device is in at least two different zones;
generate a prediction that the first mobile device is in a particular zone based on a majority of the number of predictions indicating that the first mobile device is in the particular zone; and
perform an action at the location based on the prediction that the first mobile device is in the particular zone.

16. The one or more non-transitory computer-readable storage media of claim 15, wherein the instructions cause the processor to:
obtain location information indicating in which zone of the two or more zones the first mobile device is located; and
modify the software model based on the location information.

17. The one or more non-transitory computer-readable storage media of claim 15, wherein the features include a maximum value, a minimum value, an average value, a median value, and a standard deviation value of received signal strength indications from the one or more access points.

18. The one or more non-transitory computer-readable storage media of claim 15, wherein the features include a fraction of received signal strength indications that are greater than a threshold value.

19. The one or more non-transitory computer-readable storage media of claim 15, wherein at least one of the one or more access points is disposed at an edge portion of one of the two or more zones.

20. The one or more non-transitory computer-readable storage media of claim 15, wherein the instructions cause the processor to perform the action at the location based on the prediction that the first mobile device is in the particular zone by controlling a climate control system servicing the location.

* * * * *